Figure 1:
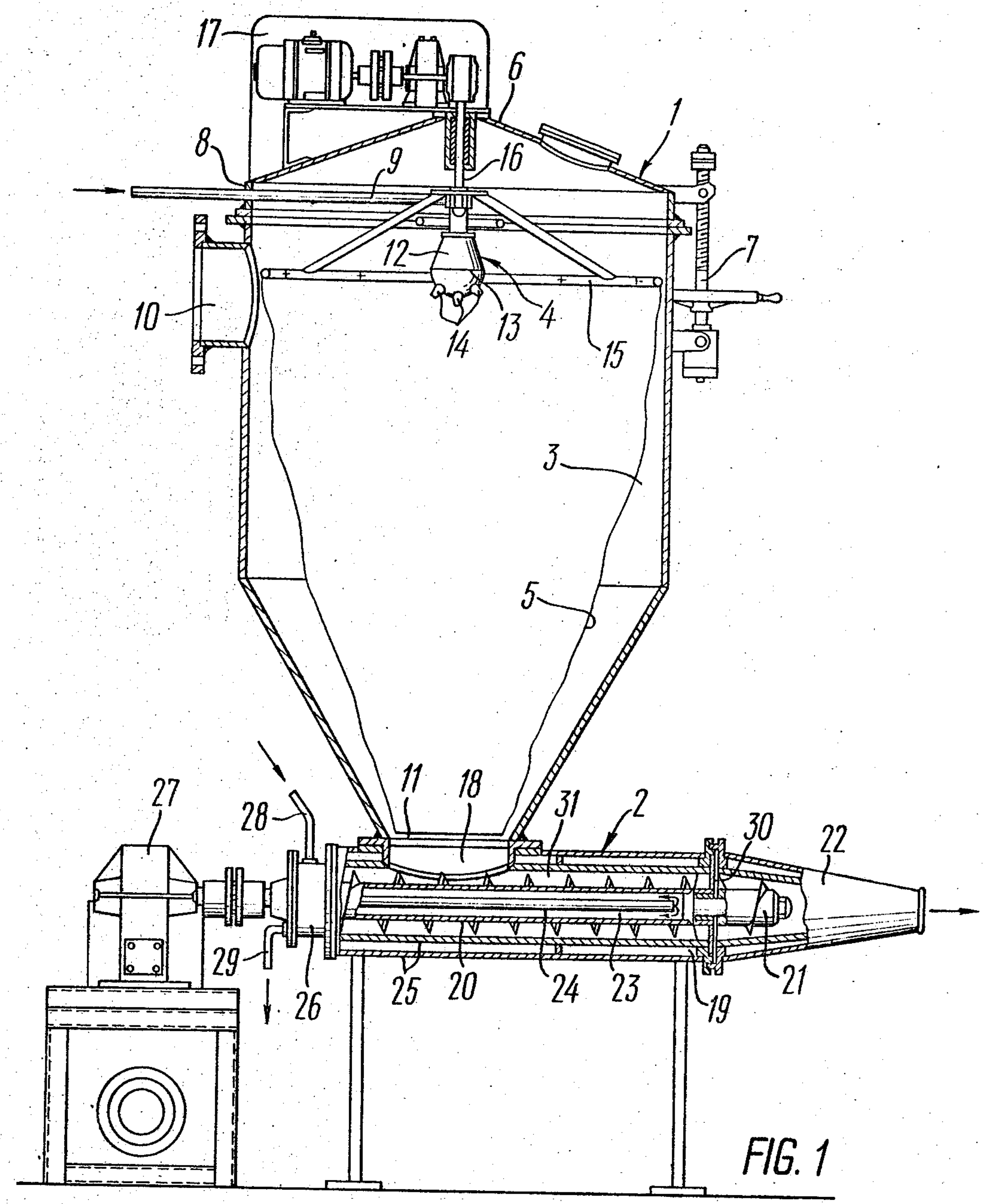

United States Patent

[11] 3,555,991

[72] Inventors Vasily Vasilievich Strakhov
Moscow;
Jury Nikolaevich Kuzmin, Khimki Moskovskoi oblasti; Alexandr Eliseevich Krikunov; Nikolai Ivanovich Tombaev; Iosif Borisovich Gisin; Anatoly Grigorievich Agafonov; Mikhail Pavlovich Zaitsev; Eda Grigorievna Shender; Vladimir Pavlovich Prityko; Maria Lukyanovna Makeeva, Moscow; Anatoly Mikhailovich Soloviev, Kalach Voronezhskoi oblasti, U.S.S.R.

[21] Appl. No. 805,740
[22] Filed Mar. 10, 1969
[45] Patented Jan. 19, 1971
[32] Priority Mar. 16, 1968
[33] U.S.S.R.
[31] 1225561

[54] INSTALLATION FOR CONTINUOUS PRODUCTION OF EDIBLE FATS, MOSTLY BUTTER AND MARGARINE
3 Claims, 2 Drawing Figs.

[52] U.S. Cl. ........................................................ 99/244, 31/37
[51] Int. Cl. ........................................................ A23d 5/001
[50] Field of Search ........................................... 99/244, 118, 119, 120, 121, 122, 123, 163, 164; 31/33, 37, 40, 46

[56] References Cited

UNITED STATES PATENTS

| | | | |
|---|---|---|---|
| 2,558,204 | 6/1951 | Wilson et al. | 99/244X |
| 2,649,377 | 8/1953 | Wilsmann | 99/244 |

*Primary Examiner*—Walter A. Scheel
*Assistant Examiner*—Arthur O. Henderson
*Attorney*—Waters, Roditi, Schwartz & Nissen

ABSTRACT: An installation for continuous production of edible fats, mostly butter and margarine, wherein a device for cooling fat emulsion is essentially a chamber accommodating a multinozzle disperser adapted to adequately spread the fat emulsion throughout the chamber volume, and a flexible receptacle for the partially finished product, said disperser being located inside said receptacle, and the augers of a worm press are heated.

17 6 8 9 16 1 7 10 12 13 4 14 15 3 5 11 18 31 2 30 22 27 28 29 26 25 20 24 23 19 21

INSTALLATION FOR CONTINUOUS PRODUCTION OF EDIBLE FATS, MOSTLY BUTTER AND MARGARINE

The present invention relates to food engineering equipment and machinery and, more specifically, to installations for continuous production of edible fats, preferably butter and margarine.

There is employed presently an installation for continuous producing of edible fats, mostly butter and margarine (cf. USSR Author's Certificate No. 142862 ), said installation comprising a technologically interlinked device for vacuum-cooling of fat emulsion and a worm press adapted to render the half-finished product obtained from fat emulsion into a finished product.

In said installation the device for vacuum-cooling of fat emulsion is essentially a chamber accommodating a receptacle made as a metal hopper rigidly attached to the chamber walls and provided with a mechanical vibration drive, and a single-nozzle disperser. The provision of only a single-nozzle disperser in the above installation fails to attain a sufficiently high efficiency thereof, since the nozzle diameter limits the amount of cream passing therethrough, whereas further increase of the nozzle diameter would adversely affect the processes of cream spraying and cooling and fat crystallization, and make it impossible for the butter grain to arise and thus impair the entire butter-making process.

Moreover, the aforesaid single-nozzle disperser fails to uniformly spread the sprayed fat emulsion throughout the chamber volume, which fact adversely affects the effective operation of the chamber itself.

Furthermore, clogging of the single-nozzle disperser, which is devoid of a special filter, results in stopping the feed of butter grain into the augers of the press, in excessive mechanical processing and thinning of the butter already found in the press, which, in turn, leads to the stopping of the entire installation, spoilage of the already worked butter and its wastage.

Another disadvantage of the known installation, is that the metal hopper thereof functions ineffectively when releasing butter grain which is in fact a loose, viscid and sticky matter. It is due to this fact that large lumps of butter grain forming on the hopper walls, are liable to give rise to "clogs" occurring in the receiving throat of the press, when being periodically shaken off, as they accumulate, onto the augers. Besides, an inadequate discharge of butter grain results in a non-homogeneous (and even low-standard) finished product as to its chemical composition and quality. On account of the hopper being rigidly held in position, some places in the vacuum chamber are inaccessible for washing purposes, whereas detaching of the hopper itself when being washed or for performing preventive maintenance procedures is substantially hampered.

No provision is made in the heretofore-known device for heating the worm press, due to the fact the coefficient of friction effective between the butter mass and the augers may appear to be slightly below, equal to and even in excess of the coefficient of friction effective between the butter mass and the housing of the press which in fact affects decisively the working capacity thereof.

The present invention has for its object to provide such an installation for continuous production of edible fats, mostly butter and margarine, at a higher production output, an improved quality of the product manufactured, as well as a reliable and trouble-free operation.

Said object is accomplished in that in an installation for continuous production of edible fats, mostly butter and margarine, comprising a technologically interlinked device for vacuum-cooling of fat emulsion and a worm press adapted to render the half-finished product obtained from said fat emulsion into a finished product, according to the invention, said device for cooling fat emulsion incorporates a multinozzle disperser adapted to uniformly spread the fat emulsion throughout the chamber volume and a flexible receptacle for half-finished product, said receptacle accommodating said disperser, whereas the augers of said worm press are heated.

Provision of the aforesaid multinozzle disperser is conductive to a considerably higher efficiency of the installation, makes it possible to uniformly spread the fat emulsion throughout the chamber volume, as well as ensures an intense spraying of the fat emulsion, which, in turn, insures the production of high-quality butter.

The employment of the aforesaid flexible receptacle makes possible a uniform discharge of the butter grain thus avoiding the formation of "clogs" in the receiver throat of the press; the uniform discharge of the butter grain from the walls of the flexible receptacle, in turn, facilitates the obtaining of a finished product homogeneous in chemical composition. The fact that the augers of the press are heated facilitates substantially the press operation, reduces the loads upon the electric motor and is instrumental in completely evacuating the butter from the press.

The multinozzle disperser mentioned above is preferably made as a hemispherical chamber provided with a screen strainer located thereinside, whereas the nozzles are preferably arranged around the periphery of said hemispherical chamber.

Provision of a plurality of nozzles in the disperser is conductive to a higher production capacity of the installation, as well as to a more uniform spraying and spreading of the stream of fat emulsion.

The screen strainer provided inside the disperser chamber is capable of intercepting extraneous particles that are liable to clog the nozzles and thereby impair the entire manufacturing process.

It is likewise favorable that the receptacle for the half-finished product be made as a flexible hose in which its cross-sectional area is gradually reduced in the direction of the flow of fat emulsion being cooled therealong.

Such a structural design of the receptacle is instrumental in a uniform release of the butter grain from the receptacle walls into the receiver throat of the press.

The aforedescribed constructional features of the installation disclosed herein add to the quality of the manufactured product, provide for a reliable and trouble-free operation of the installation and make possible a ten-fold increase of its production capacity.

Figure 2:
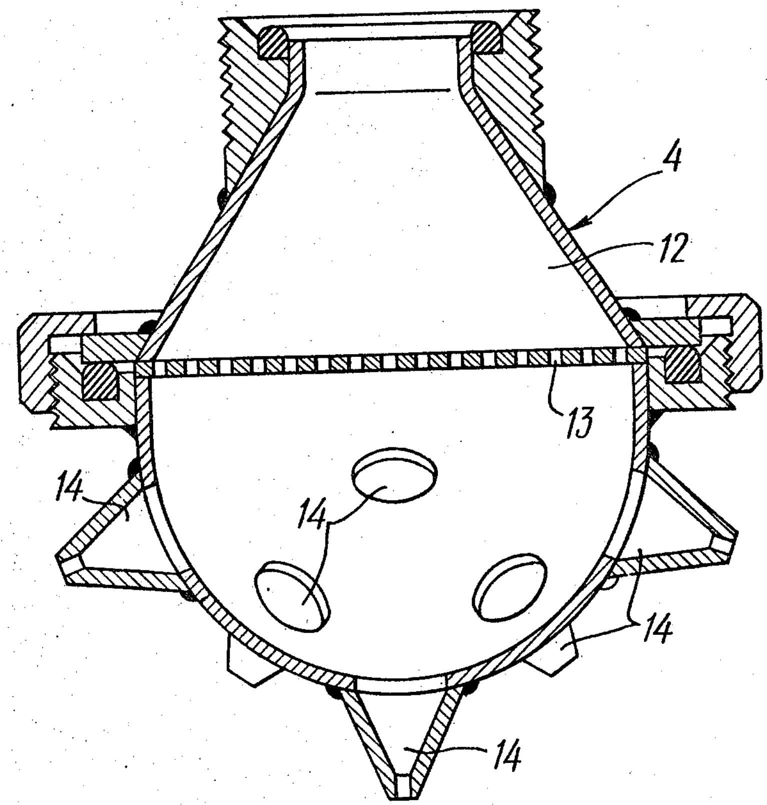

The invention will be more apparent upon consideration of a specific embodiment thereof to be had in conjunction with the accompanying drawings, wherein:

FIG. 1 is a longitudinal sectional view of the installation according to the invention; and FIG. 2 is a longitudinal sectional view an enlarged scale of a multinozzle disperser from the installation in FIG. 1.

Now referring to the drawings, FIG. 1 shows an installation for the continuous production of butter which comprises a device 1 for vacuum-cooling of fat emulsion and a worm press 2.

The device 1 for vacuum-cooling of the fat emulsion comprises a multinozzle disperser 4 FIGS. 1 and 2) located inside a chamber 3 and flexible receptacle 5 (FIG. 1) for half-finished product.

The chamber 3 is a cylindrical in shape with a bottom constituted as a frustum of a cone. The chamber 3 is provided with a lid 6 operated by means of screw elevating device 7. Passing via a hole 8 in the lid 6 is a pipeline 9 to feed high-fat cream into the chamber 3.

The chamber 3 has a hole 10 to release the vapors evolved in the course of cooling of the high-fat cream and formation of the butter grain.

Provision is made in the bottom portion of the chamber 3 for a hole 11 to discharge the butter grain therefrom. The multinozzle disperser 4 (FIGS. 1 and 2) mounted at the end of the pipeline 9 (FIG. 1), is located inside the chamber 3 in the top portion thereof.

The multinozzle disperser 4 (FIGS. 1 and 2) is essentially a hemispherical chamber 12 and is adapted to spray and uniformly spread the fat emulsion throughout the volume of the flexible receptacle 5 (FIG. 1).

Mounted inside the hemispherical chamber 12 (FIGS. 1 and 2) is a screen strainer 13 adapted to intercept any extraneous objects. Tapered nozzles 14 are arranged on the spherical surface of the chamber 12 at different angles to its vertical axis and on various concentric circles. The diameters of the round meshes of the screen strainer 13 are selected to be smaller than the diameters of the exit orifices of the nozzles 14, said tapered nozzles 14 being adapted to spray the fat emulsion.

The flexible receptacle 5 is located inside the chamber 3 (FIG. 1) below the disperser 4 and effects a timely and uniform release of the butter grain, as it is formed, from its walls. The framework of the flexible receptacle 5 is made fast on a rod 16 of a vibrating drive 17 which imparts vertically reciprocating motion to that rod.

It is due to the above-mentioned vertically reciprocating motion performed by the rod 16 that the elastic portion of the receptacle 5, which is in fact a hose gradually narrowed in the direction of the flow therealong of fat emulsion being cooled, continuously performs vibratory motion.

The worm press 2 is located below the device 1 for vacuum-cooling of the fat emulsion and is free to communicate therewith through the receiver throat 18.

The worm press 2 consists of a housing 19, a pair of augers 20 and a pair of augers 21 of which the augers 20 are located in the press housing, whereas the augers 21 are arranged in a tapered discharge nozzle 22.

Both augers 20 and 21 are located in a hollow shaft 23 inside which is a pipeline 24. Walls 25 of the press 2 are concentric and form a jacket over the whole housing 19 of the press 2. The hollow shaft 23 has one of its ends connected with a gearbox 26 of a drive 27. An end 28 of the pipeline 24 serves for delivery of hot water, whereas a free space provided between the pipeline 24 and the hollow shaft 23 serves for removal of hot water through a branch pipe 29 after having circulated over the hollow shaft 23 and the heating jacket of the housing 19.

Due to continuous circulation of hot water which is in constant contact with the surface of the augers 20 and 21, the layer of butter that is adjacent to the latter softens whereby the coefficient of friction between the butter and the augers is reduced, while adequate stirring of butter and its squeezing out of the press 2 is attained.

A perforated partition plate 30 is provided between the housing 19 and the tapered discharge nozzle 22 for mechanical treatment of the finished butter.

The installation for continuous production of butter disclosed in the present invention functions as follows.

High-fat cream is fed through the pipeline 9 into the multinozzle disperser 4 (FIGS. 1 and 2), wherein said high-fat cream is filtered through the screen strainer 13 and then is sprayed through the tapered nozzles 14 into the flexible receptacle 5 (FIG. 1).

The high-fat cream forms a spray due to its being vigorously evaporated when discharging from the nozzles 14 into a lower pressure area. Then, the particles of fat emulsion after having cooled and solidified due to moisture evaporation under vacuum settle onto the walls of the flexible receptacle 5 and, while colliding with one another and against the receptacle walls, turn into butter grain which is discharged into the throat 18 owing to vibratory motion continuously performed by the flexible receptacle 5.

Thereupon, the butter grain is discharged through the orifice of the throat 18 into a chamber 31 of the press 2, wherein the butter grain is thoroughly stirred and, under the pressure exerted by the augers 20, is forced through the perforations of the partition plate 30 and into the tapered nozzle 22 as the finished butter.

The above-described construction of the installation makes it possible to manufacture high-quality finished product, at the same time providing reliable and trouble-free operation and high production capacity.

We claim:

1. An installation for continuous production of edible fats, mostly butter and margarine, comprising: a vacuum chamber; a multinozzle disperser located in said vacuum chamber to spray cream and form fat emulsion throughout the volume of said chamber; a flexible receptacle for receiving the sprayed product said receptacle being located in said vacuum chamber, said disperser being disposed inside said receptacle; said chamber serving to cool the sprayed cream discharged from said disperser; a press at the bottom portion of the vacuum chamber to render the product obtained from the fat emulsion into a finished product; said press having augers that are heated.

2. An installation as claimed in claim 1, wherein the multinozzle disperser comprises a hemispherical chamber, a screen strainer in said chamber, and spraying nozzles arranged peripherally on said chamber.

3. An installation as claimed in claim 1, wherein the flexible receptacle comprises a hose having a cross-sectional area gradually diminishing in the direction of the flow therealong of cooled fat emulsion.